United States Patent [19]
Rouverol

[11] 3,946,621
[45] Mar. 30, 1976

[54] INTERNAL GEARING

[76] Inventor: William S. Rouverol, 1331 Arch St., Berkeley, Calif. 94708

[22] Filed: Jan. 15, 1975

[21] Appl. No.: 541,148

[52] U.S. Cl. ................................................. 74/462
[51] Int. Cl.² ......................................... F16H 55/06
[58] Field of Search ..................... 74/462, 460, 457

[56] References Cited
UNITED STATES PATENTS
3,824,873  7/1974  Rouverol .............................. 74/462

*Primary Examiner*—Leonard H. Gerin
*Attorney, Agent, or Firm*—Gordon Wood

[57] ABSTRACT

A type of internal cycloidal gearing based on the principal that different size generating circles rolling inside a directing circle which has a diameter equal to the sum of the diameters of the generating circles generate identical hypocycloids, and, similarly, a generating circle that surrounds a directing circle and gyrates around it like a "hula-hoop" generates the same epicycloid as a small circle having a diameter equal to the difference in the diameters of the surrounding "hula-hoop" circle and the directing circle.

14 Claims, 6 Drawing Figures

INTERNAL GEARING

This invention relates to the profile and shape of the teeth of internal gearing. Specifically, it relates to mating tooth profiles that afford an exceptionally large contact ratio. Gearing embodying the invention can be used in power transmissions, but its primary application is in engines, compressors and air motors, wherein a compressible working fluid is compressed or expanded in chambers bounded by the gear teeth.

The prior art discloses a variety of internal gear types appropriate for handling incompressible fluids, such as the Gerotor pump (c.f., Earle Buckingham, "Analytical Mechanics of Gears," McGraw-Hill, 1949, and Dover, 1963; pp. 42–47).

External rotary apparatus of the lobed type is also available for handling compressible fluids at low pressure, as well as vane-type air motors and compressors for higher pressures. However, there has heretofore not been available an internal gear type that allowed for sufficient sealing effectiveness to be useful for high pressure compressible fluid applications.

The object of the invention is therefore to provide a type of internal gearing that lends itself to maximum control of contact pressures between mating teeth and has an exceptionally large contact ratio, so that it is adapted to provide a simple and inexpensive but effective means for handling compressible fluids at high pressure and hence is useful for compressors and internal combustion engines.

The means to achieve this and other objects and advantages of the invention will be evident from the drawings and specifications that follow.

Figure 1:
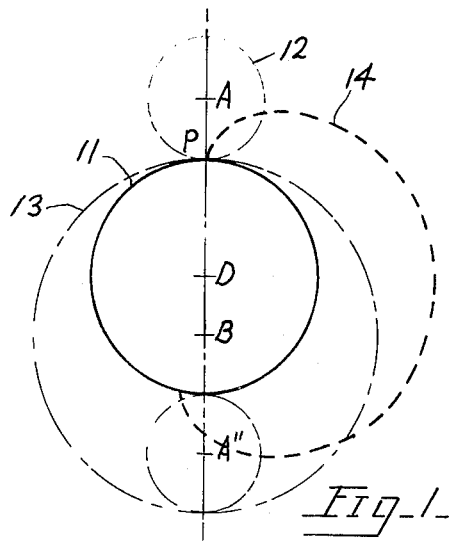
FIG. 1 is a diagram showing the two rolling circles of different diameter that can generate the same epicycloid.

In detail and referring to FIG. 1, a fixed circle 11 centered at D is called the "directing circle." Tangent to it at point P are two other circles 12, 13, called "generating circles." One of these generating circles 12 has a diameter smaller than the diameter of the directing circle 11, and other 13 has a diameter that is larger than circle 11, so that it surrounds it.

As the smaller generating circle 12, which is called the "minor generating circle," moves from its starting position with center at A and rolls clockwise around the directing circle 11 without sliding, a point P on its circumference traces an epicycloid 14. Similarly, if the larger generating circle 13 gyrates around the directing circle 11 without sliding and with its point of tangency to the directing circle also moving clockwise, starting from a point at which its center is at a point B on the same line of centers as points A, P and D, a point P on its circumference will trace the same epicycloid 14. This larger generating 13 is called the "major generating circle," and the only condition required for it to generate the same epicycloid 14 the minor generating circle 12 generates is that its diameter be larger than that of the directing circle 11 by an amount equal to the diameter of the minor generating circle 12.

Figure 2:
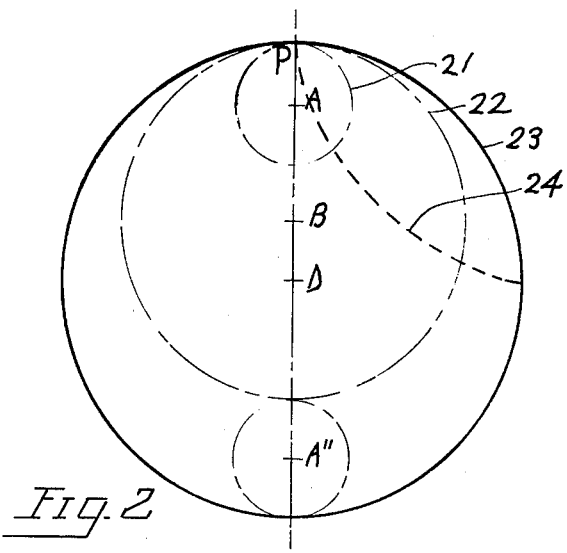
FIG. 2 is a diagram showing the two rolling circles of different diameters that can generate the same hypocycloid.

A corresponding phenomena applies to the hypocycloid. Referring to FIG. 2, a smaller or minor generating circle 21 and a larger or major generating circle 22 are both tangent to a directing circle 23 that has a larger diameter than either generating circle. The point of tangency is again indicated as P and the respective circle centers A, B and D are in a line containing P. As the two generating circles 21, 22 roll around inside the directing circle 23 without slipping, point P traces a common hypocycloid 24 if the diameters of the generating circles 21, 22 add to equal that of the directing circle 23.

Figure 3:
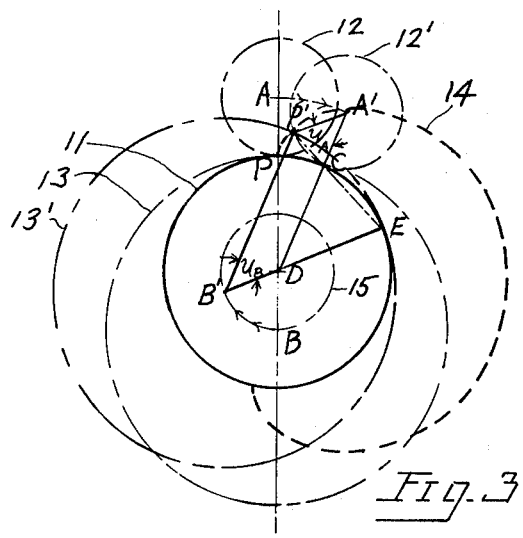
FIG. 3 is a diagram of the circles of FIG. 1 which also shows the construction required to prove that both circles generate the same epicycloid.
Figure 4:
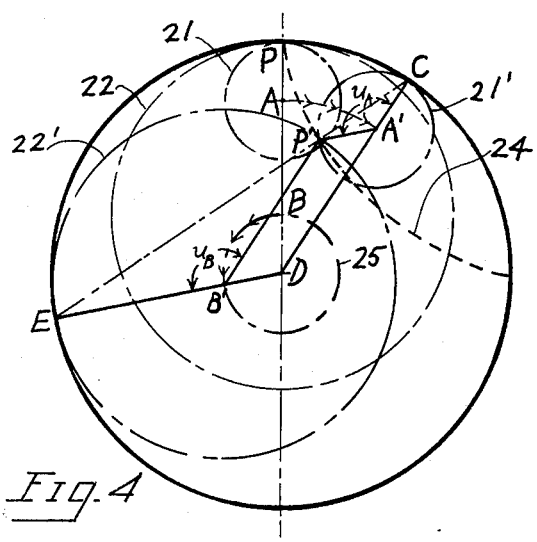
FIG. 4 is a diagram of the circles of FIG. 2 which also shows the construction required to prove that both circles generate the same hypocycloid.

To prove that the generating circles 11, 12 in FIG. 1 and 21, 22 in FIG. 2 generate identical epicycloids and hypocycloids respectively, a construction or linkage is shown in FIG. 3 and FIG. 4. In these constructions corresponding points and links have the same letter designation, and one analysis will apply to both the epicycloid case of FIG. 3 and the hypocycloid use of FIG. 4.

In the construction of FIG. 3, the minor generating circle 12 rolls around the directing circle 11, its center moving clockwise from the position A and A' and its circumference moving to the position 12'. In this position the contact point with the directing circle 11 has moved to the position C, and the point P on its circumference has moved to the position P'. Since there has been no sliding between the minor generating circle 12 and the directing circle 11, the arc CP measured out by its tangent point is equal to the arc CP', and the radius AP will have rotated around to the position A'P'. The contact arc CP' subtends an angle $\mu_A$ at the center A' of the minor generating circle 12.

Considering next the action of the major generating circle 13, starting with its center at B, it moves around the center D of the directing circle 11, also in the clockwise direction, following a circular path 15 to a point B'. In this position 13' its point of tangency with the directing circle 11 is at E, and it will have measured out the arc PE on the circumference of the directing circle 11. If there has again been no sliding, the arc EP will equal the arc EP', and the angle subtended by this arc at the center B' of the major generating circle 13 will be $\mu_B$. The points E and C will both be instantaneous centers for the point P'.

To prove that the point P on the major generating circle 13 traces the same epicycloid 14 as the corresponding point on the minor generating circle 12, it must be shown that the line ECP' is a straight line, and that the distance CP' on this line is the same for both generating circles 12, 13. If the angles $\mu_A$ and $\mu_B$ are equal, the figure A'P'B'D is a parallelogram because A'P' and B'D are equal radii of identical circles. The conditions for P' to be a common point on the curves traced by the two generating circles 12, 13 can then be demonstrated from the equality of the main links in the construction, all of which are equal radii or the difference of equal radii of the three circles 11, 12, 13 of the construction:

$$AP = A'P' = A'C = BD = B'D \qquad (1)$$

$$DE = DC \tag{2}$$

$$BP = B'P' = B'E = DA = DA', \text{ and} \tag{3}$$

isosceles triangles A'P'C, CDE and B'EP' are similar.

The same proof applies to the construction of FIG. 4, except that in this case the center B of the major generating circle 22 moves counterclockwise on the circular path 25 to B'. Like the construction of FIG. 3, the elements of FIG. 4 comprise a basic pantograph linkage.

Figure 5:
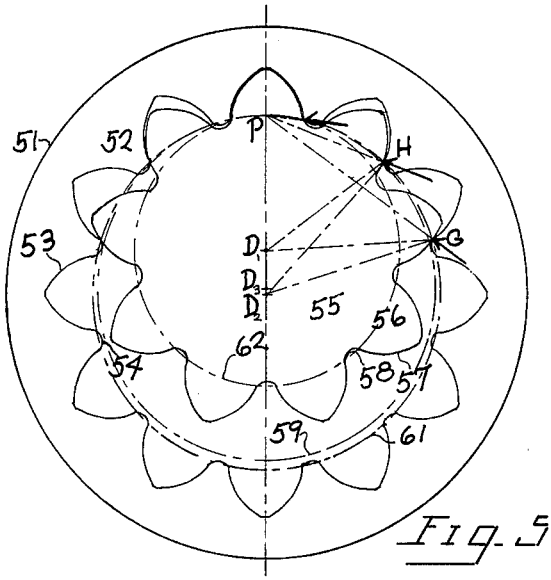
FIG. 5 is a sectional view of a set of typical internal gears embodying the invention.

In FIG. 5, which shows a sectional view of a set of internal gears embodying the invention, 51 is an annular gear mounted for rotation about its center at $D_2$ and having teeth 52 that have concave epicycloidal dedenda 53 and small convex hypocycloidal addenda 54. The mating pinion 55 is mounted for rotation about its center at $D_1$ and has teeth 56 with convex epicycloidal addenda 57 and small concave hypocycloidal dedenda 58. It will be noted that the arrows representing pressure between tooth contact areas are all directed toward the pitch point P. The law of gearing is therefore satisfied at all contact points, which lie on the path of contact circle 59 centered at $D_3$. In the configuration shown, this path circle 59 lies close to the annular gear pitch circle 61. Depending on the tooth proportions desired, it may lie anywhere between the pitch circles 61, 62, or may coincide with either of them. If it does coincide, the corresponding minor generating circle (63 or 64 in FIG. 6) will have a zero diameter, and tooth contact along the path 59 will be entirely on the point of the teeth of whichever gear has a pitch circle that coincides with the path of action. In practical applications, such teeth would need to be tipped with a highly wear-resistant material.

Figure 6:
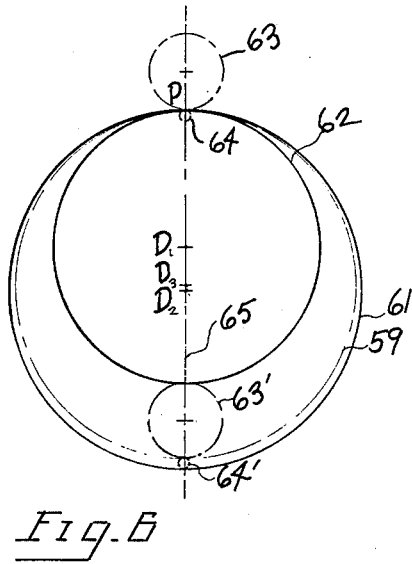
FIG. 6 is a diagram showing the relation of the generating circles for the tooth profiles of the internal gear set of FIG. 5.

In FIG. 6, the generating and directing circles for the example of FIG. 5 are shown, all tangent at the pitch point P. The contact path 59 is the major generating circle for all addendum tooth portions, using the pinion pitch circle 62 as the directing circle for generating the pinion epicycloid addendum profiles 57 and the annular gear pitch circle 61 as the directing circle for generating the annular gear hypocycloid addendum profiles 54. The corresponding minor generating circles are shown at 63 and 64 respectively, and these circles also serve to generate the dedenda 53, 58 of the teeth of both gears 51, 55 respectively.

It will be seen from FIG. 6 that if the minor generating circles 63, 64 are moved to the opposite end of the line of centers 65, to the positions 63' and 64' respectively, that the conditions requiring major and minor generating circles to have diameters that have a sum or difference equal to that of the directing circle are fulfilled, so that major and minor generating circles will generate the same epicycloid or hypocycloid. The diameters of circles 63 and 62 add to equal the diameter of the generating circle 59, and the diameters of circles 61 and 64 subtract to equal it. Taken all together, it will be seen that the sum of the diameters of circles 62, 63 and 64 add to equal that of circle 61.

The relative size of the circles 63' and 64' will depend on the performance requirements. A small diameter for circle 63' and a large one for circle 64' will give limited tooth pressure and hence light sealing pressure and long wear life. Conversely, if the relative sizes are reversed, the sealing pressure will be increased and the wear life reduced.

The essential differences between the particular embodiment of the invention intended for use as a compressor or engine, and such prior art devices as the Gerotor or other rotary pumps, is that application to compressible working fluids introduces different requirements for the teeth. In pumps such as the Gerotor there is a zone of high pressure on one side of the plane of the rotor axes and one of low pressure on the other. The ports are large, and the critical tooth seals are those slightly on the low pressure side of this central plane. When the pinion drives the annular gear, the tooth pressure of these critical seals is increased, and the pump operates at its maximum effectiveness. When the annular gear drives, however, the sealing pressure is reduced and the efficiency of the pump correspondingly reduced. It is for this reason that Gerotor pumps are nearly always driven through the pinion.

In the present invention the opposite is the case. The pressure of the working fluid varies throughout the device and is at a maximum in the vicinity of the pitch point. Effective sealing therefore requires that tooth contact pressures be at a maximum near the pitch point, and this means that the torque transmission must be through the annular gears. The work of the pinion, whether it be by or on the working fluid or on the end seals, must therefore be great enough to insure that sufficient power is transmitted through the pinion teeth to obtain effective sealing. This will ordinarily require that the path of contact be closer to the annular gear pitch circle than it is to the pinion pitch circle, particularly if the end seals have a low friction loss. This feature is indicated in FIG. 5 for typical seal points at G and H. It will be evident that the distances to these points $D_1G$ and $D_1H$ from the center $D_1$ of the pinion pitch circle 62 are quite different. The torque exerted on the pinion 55 by the working fluid in this particular tooth space will be equal to the average of these two lengths times the fluid pressure times the different of the two lengths. When this difference is large, the torque contribution of this tooth space is large, and when the difference is small, the torque contribution will be correspondingly small.

It should also be noted that the distances $D_2M$ and $D_2H$ in FIG. 5 are almost equal. The torque exerted on the annular gear 51 by the working fluid pressure in this tooth space will therefore be very small. This is in accordance with the preferred embodiment of the invention as applied to compressors and engines. The main work done by or on the working fluid is by the pinion, with torque transmission to or from the pinion applied through the annular gear teeth so as to effect a sealing action sufficient to confine the working fluid within chambers bounded by adjacent teeth.

Various minor modifications may be made to the gear teeth described in this specification without departing from the spirit and scope of the folllowing claims. For example, the generating curve 59 in FIG. 6 could deviate slightly from a true circle. Any curve having a radii of curvature that are at all points greater than those of the inner directing circle 62 and smaller than those of the outer directing circle 61 can be rolled on these circles, and points on such a curve will generate profiles satisfying the law of gearing. Slightly spiral or elliptical curves can be used, for example. Alternatively, as Buckingham notes (op. cit., p.15) if the path is given, the profiles of both pinion and annular gear are fixed and may be calculated. This is preferable to selecting a pinion or annular gear tooth profile and calculating the path, since it is the latter that is critical if effective sealing is to be achieved.

Applications of the gearing herein disclosed to a compressor or the compression phase of an internal-combustion engine requires a shorter path of contact than is possible for applications involving an expansion of the working fluid. This is because the tooth surface friction angle adds to the pressure angle on the approach side and subtracts from it on the recess side. Since the teeth will bind if the sum of the pressure angle and friction angle exceeds 90°, initial tooth contact in the region at the opposite side of the gear set from the pitch point must be avoided. Several methods are available for preventing this premature tooth engagement: (a) use of at least two more teeth on the annular gear than on the pinion, and preferably 3 or 4 or occasionally even more; (b) reduction of the addendum heights of the pinion or annular gear teeth, so the intersection of one or both addendum circles with the path curve is closer to the pitch point; or (c), relief of the tooth tips on either the leading surface of the annular gear teeth or the trailing surface of the pinion teeth, or both. This last alternative (c) results in an asymmetrical tooth, but in an engine such asymmetry would make it possible to have different ratios of compression and expansion in a single gear set in which firing occurs near the pitch point.

Other possible modifications include those that would be made to other forms of gearing for corresponding purposes. For example, the teeth could be made helical or relieved slightly to foster smooth and quiet operation. In the case of engine or compressor applications, the relief may extend over the full tooth profile so as to cause the tooth contact pressure to vary more or less in the manner in which the working fluid pressure varies. A method of achieving a varying tooth pressure is disclosed in copending U.S. Pat. application Ser. No. 529,298. In general, tooth relief will be preferable to use of a helix angle for compressor or engine applications, since helix angles reduce the compression ratio.

The above specification describes embodiments of the subject gearing that are mounted for rotation on fixed centers. It will be evident that one gear can be gyrated within or around the other, as for example in a "planocentric" drive or a Wankel-type engine or compressor. The claims are therefore also intended to cover the use of the invention in such configurations, unless otherwise indicated.

In "planocentric" or fixed center power transmissions, the gearing herein disclosed has exceptional torque capacity. This is the result of the subject gearing having two paths of contact on one side of the line of centers. In FIG. 6 these are the circles 59 and 63. The former has numerous points of contact, and the latter has close conformity somewhat in the manner of Novikov gearing. If the pinion drives, both these paths will be on the recess side, which is usually preferred for minimization of friction and noise.

In general, the preferred embodiments of the invention will depend on the function of the gears. For engine or compressor applications, the primary consideration will be effective sealing. The torque to be transmitted is fairly small relative to the gear sizes, so as much torque as possible should be carried through the teeth. This requires that circle 64 in FIG. 6 be considerably smaller than 63 and that the only deviations from theoretical profile conjugacy be the very minute ones that improve sealing, as indicated above. It is especially important in engine and compressor applications that conjugacy be maintained in profile portions contacting near the pitch point, because of the high workingfluid pressures in this region.

For applications of the invention in power transmission devices, including planocentric drives, there is no sealing requirement, and the primary desideratum is a high torque capacity. This calls for maximization of the relative radius of curvature of the mating addenda on the longer path of contact (circle 59) by using circles 63 and 64 with diameters that are considerably more similar than is indicated in FIG. 6. In addition, the loading of the gears in the vicinity of the pitch point should be eased or eliminated, as this is a region where the relative radius of curvature approaches zero and the Hertzian stresses therefore become very great. The profile curves of one or both gears should therefore be relieved for a short distance on both sides of the pitch circle, or the radius of curvature of the profiles increased in this region. In either case, the tooth profiles will be out of contact when near the pitch point, substantially as indicated in my co-pending U.S. Pat. application, Ser. No. 529,298. Alternatively, if near the pitch circle a short segment of exponential or railway transition spiral as defined in said application is used instead of the cycloidal curves, this will accomplish essentially the same purpose as tooth profile relief.

The prior art includes the "mutually generative rotors" patents of M.F. Hill, such as U.S. Pat. Nos. 1,682,563; 1,682,564; 1,682,565; 1,833,993; 2,031,888; and 2,091,317.

For the purposes of the ensuing claims, the following terms shall have the following meanings: "minor generating circle" shall mean that generating circle for a hypocycloid or epicycloid that has the smaller of the two possible generating circle diameters; "addendum portion" shall mean all or part of the active portion of the tooth profile on the opposite side of the pitch circle from the tooth root; "pitch surface" shall mean the surface of revolution generated by the pitch line as it moves around the axis of a gear at a fixed distance therefrom; "pressure angle" shall mean the angle between a tangent to the tooth profile and a radial line at a particular point on the tooth profile which is not at the pitch radius unless so specified; "internal gears" means a set of mating gears comprising one external pinion gear and one annular gear; and "relieved" means having a slight amount of material removed from a conjugate tooth surface.

I claim:
1. In a pair of mating internal gears,
   a pinion and an annular gear,
   teeth formed on said gears to have, in planes perpendicular to the common pitch element of said pair, a path of contact including a curved portion lying between the pitch circles of said pair and being closer to one pitch circle than the other,
   the radius of curvature at profile points on the working portion of the teeth of said annular gear varying with the distance of said points from the pitch circle of said annular gear,
   the segment of said path of contact lying on one side of the pitch point of said pair containing, for all rotational positions of said pair, a plurality of contact points at all of which the opposed profile curves are convex.

2. A pair of mating internal gears according to claim 1 wherein said pinion has teeth the profiles of which in said planes include an addendum portion shaped substantially to the form of an epicycloid, said annular gear has teeth the profiles of which in said planes include an addendum portion shaped substantially to the form of a hypocycloid, and the sum of the diameters of the pitch circle of said pinion, the minor generating circle of said epicycloid, and the minor genrating circle of said hypocyloid is substantially equal to the diameter of the pitch circle of said annular gear.

3. A pair of mating internal gears according to claim 2 wherein the diameter of one of said minor generating circles is several times as large as the other.

4. A pair of mating gears according to claim 1 wherein said pinion is an idling member, free of any mechanical means other than its teeth for applying torque to it.

5. A pair of mating gears according to claim 1 wherein the teeth of said one of said pair that has its pitch circle closest to said path of contact is made of a material that is substantially harder than that of the teeth of the other of said pair.

6. A pair of mating gears according to claim 1 wherein the sum of the pressure angle and the friction angle is less than 90°.

7. A pair of mating gears according to claim 1 wherein the addendum height and dedendum depth of one of said pair are unequal.

8. A pair of mating gears according to claim 1 wherein the number of teeth on said pinion differs from the number of teeth on said annular gear by more than one.

9. A pair of mating gears according to claim 1 wherein the number of teeth on said pinion differs from the number of teeth on said annular gear by one.

10. A pair of mating gears according to claim 1 wherein the common normals to the profiles at said contact points pass substantially through said pitch point.

11. A pair of mating gears according to claim 1 wherein the teeth are asymmetrical on one of said gears.

12. A pair of mating gears according to claim 1 wherein portions of the surfaces of the teeth of one of said pair are relieved.

13. A pair of mating gears according to claim 1 wherein the teeth are slantingly disposed with respect to the common pitch element.

14. A pair of mating gears according to claim 1 wherein the axis of one of said pair rotates about the axis of the other.

* * * * *